United States Patent [19]

Heismann

[11] Patent Number: 4,958,483
[45] Date of Patent: Sep. 25, 1990

[54] ROPE GUIDE

[75] Inventor: Richard A. Heismann, Collierville, Tenn.

[73] Assignee: The Toro Company, Minneapolis, Minn.

[21] Appl. No.: 489,734

[22] Filed: Feb. 27, 1990

Related U.S. Application Data

[63] Continuation of Ser. No. 230,907, Aug. 11, 1988, abandoned.

[51] Int. Cl.$^5$ .............................................. A01D 34/67
[52] U.S. Cl. ....................................... 56/17.5; 56/255; 403/104; 123/185 A
[58] Field of Search ...................... 56/10.8, 11.3, 17.5, 56/255, 16.7; 180/19.1, 19.3; 123/179 SE, 185 A; 403/7, 8, 104, 105

[56] References Cited

U.S. PATENT DOCUMENTS

| | | | |
|---|---|---|---|
| 1,050,473 | 3/1977 | Levan | 403/104 |
| 1,068,030 | 7/1913 | Whitmore | 403/104 |
| 1,550,701 | 8/1925 | Hoyt | 403/104 |
| 2,912,966 | 11/1959 | Mitchell | 123/179 |
| 4,011,700 | 3/1977 | Sado | 403/104 |
| 4,109,538 | 8/1978 | Glenday et al. | 74/139 |
| 4,433,530 | 2/1984 | Schaefer | 56/11.8 |
| 4,458,472 | 7/1984 | Christopherson | 56/10.5 |

FOREIGN PATENT DOCUMENTS

| | | | |
|---|---|---|---|
| 47417 | 3/1982 | European Pat. Off. | 56/10.8 |
| 2804648 | 8/1979 | Fed. Rep. of Germany | 56/17.5 |

Primary Examiner—John Weiss
Attorney, Agent, or Firm—John T. Synnestvedt; Richard D. Weber

[57] ABSTRACT

A rope guide for the recoil starter rope of a power lawn mower, said rope guide being adapted for attachment to an extruded mower handle member having a substantially C-shaped configuration without drilling, cutting or otherwise deforming the handle member. The guide comprises a tubular body portion having an inner configuration in substantial conformity with the outer configuration of the handle member and adapted to receive the handle member therewithin in close fitting, sliding relation. The body portion is attached to the handle member by means of a screw passing through a bore in the body portion, through the opening in the handle member and into a threaded plate within the handle member spanning the opening therein. An arm portion extending outwardly from the body portion includes an aperture therein for receiving and guiding the mower starter rope.

8 Claims, 1 Drawing Sheet

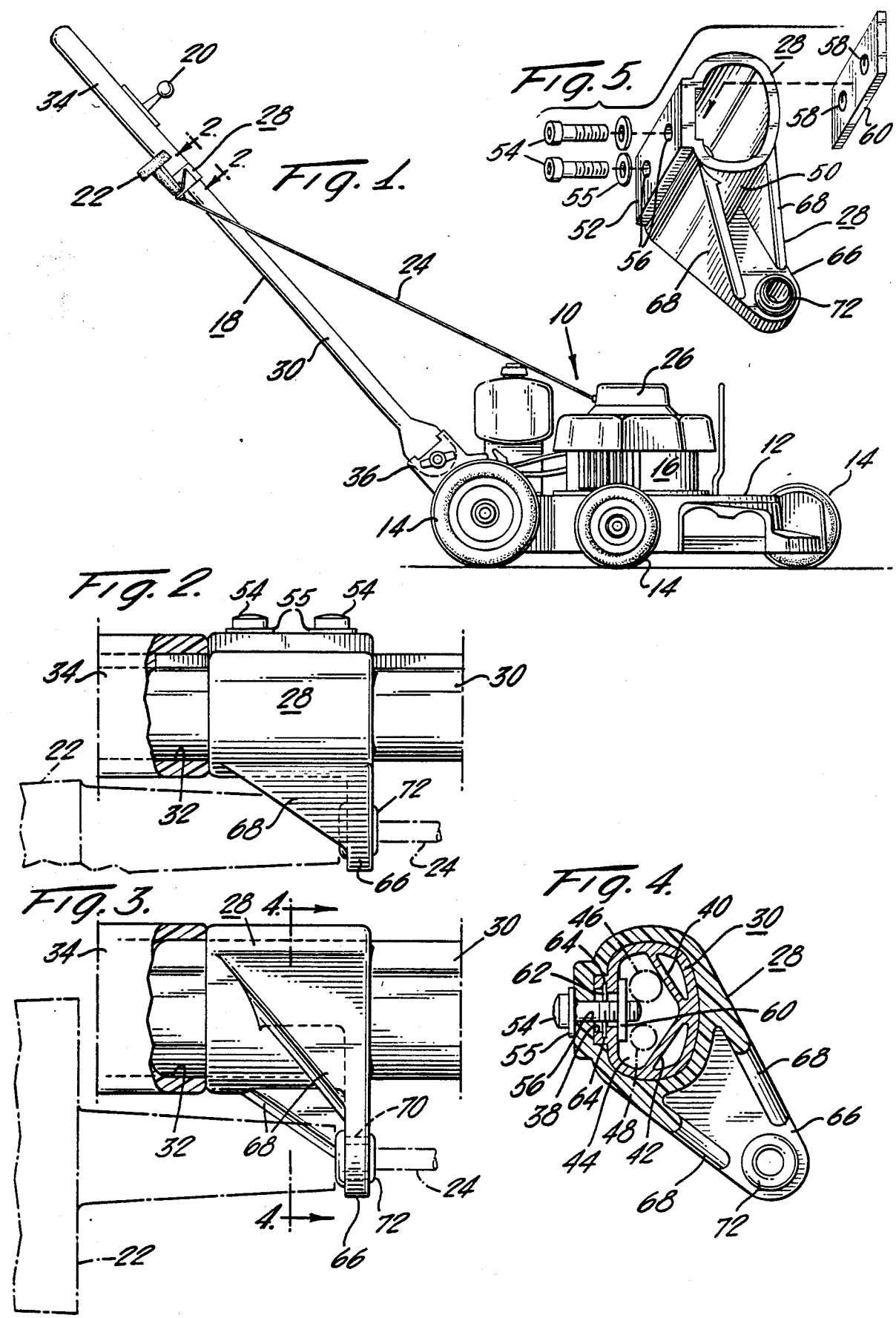

ROPE GUIDE

This is a continuation of copending application Ser. No. 230,907, filed on Aug. 11, 1988, now abandoned.

BACKGROUND OF THE INVENTION

The present invention relates generally to guide arrangements for ropes and the like and relates more particularly to a molded plastic rope guide for attachment to the extruded handle of a lawn mower.

Small power lawn mowers of the type powered by an internal combustion engine typically are started by means of a recoil starter which includes a rope terminating in a small handle. Although early model mowers usually located the starter rope handle directly on the engine, more recently the preferred location for the starter handle is on the mower handle where it can be reached from the operator's walk-behind position. This location is particularly preferred with mowers which automatically shut off the engine when the operator releases the handlebar operating lever, and which thus require frequent restarting.

In order to maintain the rope and handle within reach of the operator, some form of rope guide is required on the handle, and this conventionally has been either mounted directly to one of the pairs of longitudinal handle members, or to a cross member extending between the handle members. Since the conventional mower handle is made of round tubular steel stock, the rope guide is typically through-bolted to one of the tubular handle members.

Newer mower designs are utilizing handles of irregular extruded shapes rather than the conventional round tubular shape. For example, a C-shaped extrusion is presently being utilized which permits the mounting of the engine and mower control cables within the handle members. With the use of such handle shapes, it is no longer feasible to through-bolt the rope guide to a handle member, since the handle member size and shape would not support such fastenings without compromising the strength of the handle, and cables within the handle member would interfere with such fastenings.

SUMMARY OF THE INVENTION

The present invention is directed to a rope guide adapted for use with irregularly shaped extruded handle members and includes a tubular body portion having an inner wall configuration similar to the exterior wall configuration of the handle member. The body portion is adapted to slide over the handle member in close fitting relation therewith, and clamping means are provided for securing the body portion to the handle member without drilling through the handle member. A strut or arm portion of the rope guide extends substantially perpendicularly from the body portion and includes an aperture in the outer end thereof for receiving and guiding a rope passing therethrough.

The present rope guide is designed specifically for use with a C-shaped handle member, and the clamping means includes a screw passing through a bore in the body portion and thence through the open slot provided by the C shape of the handle member. Threaded screw receiving means such as a plate having a threaded bore are provided within the C-shaped handle member for cooperative engagement by the screw to secure the guide in position on the handle member.

The present rope guide may be formed of molded plastic or die cast aluminum and the shape of the body portion may thus readily be made to conform to that of the handle member.

It is accordingly a first object of the present invention to provide a rope guide for mounting on an irregularly shaped member and specifically a C-shaped extruded handle member, the attachment thereof requiring no drilling, cutting or deformation of the member.

A further object of the invention is to provide a rope guide as described which can be quickly and easily attached to the handle member.

Another object of the invention is to provide a rope guide as described which when attached to the handle member does not interfere with the passage of control cables within the handle member.

Still another object of the invention is to provide a rope guide as described of a simple light-weight design and which can be inexpensively manufactured.

Additional objects and advantages of the invention will be more readily apparent from the following detailed description of an embodiment thereof when considered in conjunction with the accompanying drawings.

BRIEF DESCRIPTION OF THE DRAWINGS

FIG. 1 is a right side elevational view of a lawn mower having a recoil starter rope guide in accordance with the present invention;

FIG. 2 is an enlarged view partly in section taken along line 2—2 of FIG. 1;

FIG. 3 is a side elevational view partly in section of the rope guide of FIGS. 1 and 2;

FIG. 4 is a sectional view taken along line 4—4 of FIG. 3; and

FIG. 5 is a perspective exploded view showing the rope guide and fasteners.

DESCRIPTION OF THE PREFERRED EMBODIMENT

Referring to the drawings and particularly FIG. 1 thereof, a power lawn mower 10 is illustrated having a frame 12, wheels 14 and an engine 16. The mower is of the walk-behind type, and is thus provided with a handle assembly 18 by means of which the mower movements are controlled by the operator. Certain engine controls are conveniently provided on the handle assembly, including a throttle control lever 20 and a "dead man" control bar [not shown] for automatically stopping the engine or the cutting blade when the bar is released.

Also mounted on the handle assembly within convenient reach of the operator is a starter handle 22 on the end of rope 24 of engine recoil starter 26. The handle 22 is held at the ready position on the handle assembly by a rope guide 28 in accordance with the present invention which is mounted on one of the spaced pair of generally parallel longitudinal handle members 30 of the handle assembly. At their upper ends, the handle members 30 are received in sockets 32 of molded plastic handle element 34 extending transversely therebetween and on which is mounted the throttle control lever 20. At their lower ends, the handle members 30 are secured within end fittings 36 which are pivotally connected to the mower frame.

As shown in FIG. 4, the handle members 30 are formed of a thin-walled extrusion having a substantially C-shaped cross-section characterized by a longitudinal opening 38 along one side thereof. To provide increased strength, the extrusion includes diagonal interior webs 40 and 42 opposed from the opening 38. A chamber 44 formed within the member 30 between the opening 38 and the webs 40 and 42 provides a convenient protected route for engine control cables 46 and 48, which carry the throttle control and engine or blade shut-off signals. The handle members are preferably formed of aluminum or other light-weight metal or alloy. In view of their irregular thin-walled extruded shape and reinforcing webs, the handle members cannot be bent, drilled or otherwise deformed without significantly weakening the handled structure.

The rope guide 28 comprises a sleeve-like tubular body portion 50 adapted to slidably overlie one of the handle members 30. The inner configuration of the body portion 50 is substantially identical to the outer configuration of the member 30. The body portion includes a flat portion 52 opposite the opening 38 of the handle member, and it is through this portion 52 and the opening 38 that threaded fastening means are employed in cooperative engagement with means within the chamber 44 to secure the rope guide in the desired position on the member 30.

Specifically, the fastening means comprises a pair of screws 54 provided with washers 55, which screws pass through bores 56 in the flat portion 52 and cooperatively engage threaded apertures 58 within a plate 60 disposed within the chamber 44. The plate 60 has a width wider than the opening 38 of the handle member, and, upon tightening of the screws 54, frictionally clamps the body portion 50 to the handle member 30, thereby securing the rope guide in the desired position thereon. As shown in FIGS. 1-3, the rope guide is preferably positioned on the right hand handle member 30 near the upper end thereof, immediately adjacent the molded handle element 34. A thin cover strip 62 of metal or plastic is inserted within opposed slots 64 of the member 30 to close the opening 38 below the rope guide, thereby concealing the control cables 46 and 48 and closing the chamber 44 against the entry of moisture or foreign matter. The strip 62 also improves the appearance of the handle member.

Extending substantially perpendicularly to the body portion 50 is an arm or strut 66 which is reinforced along each side edge by diagonal webs 68. An aperture 70 near the outer end of the arm 66 is provided with a plastic grommet 72 and serves to receive and guide the rope 24 of the engine recoil starter 26. The length of the rope 24 is adjusted so that the handle 22 is returned into engagement with the rope guide 28 and specifically the arm 66 thereof when the recoil starter is in the completely recoiled position. The handle 22 will thus be maintained by the rope guide in a convenient position ready for the next engine starting sequence.

The positioning and attachment of the rope guide to the handle member is most readily accomplished by loosely threading the screws 54 into the plate 60, and then sliding the guide onto and along the member until the desired position is reached, whereupon the screws are tightened to secure the guide in position.

Although it will be apparent that the inner configuration of the body portion need not precisely match the outer configuration of the handle member, it should be similar such that the body portion receives the handle member in close fitting relation. Preferably, the inner configuration of the body portion is substantially identical to the outer configuration of the handle member, sufficient clearance being provided to permit the sliding movement of the guide along the handle member. Since the body portion is a closed tubular element while the handle member is substantially C-shaped, the term substantially identical refers to that portion of the body portion inner configuration which directly overlies the C-shaped handle member. The flat portion 52 overlies the opening 38 of the handle member and accordingly cannot conform to the handle member shape.

From the foregoing it can be appreciated that the present invention provides a simple, light-weight rope guide for attachment to a C-shaped handle member without drilling, cutting or otherwise deforming the member. The attachment can be carried out quickly, the only tool required being a screw driver. The rope guide can be molded of plastic, or die cast in aluminum or other lightweight metal, and is thus readily configured to match an irregularly shaped extruded handle member.

Manifestly, changes in details of construction can be effected by those skilled in the art without departing from the invention.

I claim:

1. In combination, an extruded member having a substantially C-shaped cross-section and hence a longitudinal opening in one side thereof, and a rope guide for attachment to said member, said guide comprising;
    a tubular body portion having an inner wall configuration similar to the exterior wall configuration of said member to receive said member therewithin in close-fitting, sliding relation
    means for selectively securing said body portion to said member, said means comprising a threaded element within said member and screw means threadedly connecting said body portion with said threaded element, said screw means passing through the opening in said member,
    an arm portion extending outwardly from said body portion, and
    an aperture in said arm portion for receiving and guiding a rope passing therethrough.

2. The invention as claimed in claim 1, wherein said screw means comprises a screw passing through a bore in said body portion.

3. The invention as claimed in claim 1, wherein said threaded element comprises a plate spanning the opening in said member.

4. In combination with a lawn mower handle member having a substantially C-shaped cross-section and hence having a longitudinal opening along one side thereof, a rope guide for the starter rope of the lawn mower recoil starter, said guide comprising;
    a tubular body portion having an inner wall configuration in substantial conformity with the exterior wall configuration of said handle member to receive said member therewithin in close-fitting, sliding relation,
    means for selectively securing said body portion to said member, said means comprising a plate disposed within said handle member and spanning the opening therein, a threaded aperture in said plate, and a screw passing through a bore in said body portion, said screw passing through said handle member opening into threaded engagement with said aperture in said plate,
    an arm portion extending substantially perpendicularly from said body portion, and an aperture in said arm portion for receiving and guiding a rope passing therethrough.

5. The invention as claimed in claim 4, wherein said aperture in said arm portion is located near the outer end of said arm portion, and a molded grommet disposed within said aperture in said arm portion for facilitating passage of the rope therethrough.

6. The invention as claimed in claim 4, wherein said arm portion includes a reinforcing web extending from said body portion.

7. The invention as claimed in claim 4, wherein said rope guide comprises a unitary plastic molding.

8. The invention as claimed in claim 4, wherein said rope guide comprises a unitary metal casting.

* * * * *